United States Patent [19]

Durden et al.

[11] Patent Number: 5,003,384

[45] Date of Patent: Mar. 26, 1991

[54] SET-TOP INTERFACE TRANSACTIONS IN AN IMPULSE PAY PER VIEW TELEVISION SYSTEM

[75] Inventors: Gregory S. Durden, Jonesboro; Ray T. Haman, Jr.; Scott L. Hamilton, both of Duluth; Richard B. Frederick; David J. Naddor, both of Doraville; Randolph J. Schaubs, Stone Mountain, all of Ga.

[73] Assignee: Scientific Atlanta, Inc., Atlanta, Ga.

[21] Appl. No.: 176,776

[22] Filed: Apr. 1, 1988

[51] Int. Cl.⁵ .................... H04N 7/167; H04N 7/10
[52] U.S. Cl. .......................... 358/84; 455/2; 358/349; 358/86
[58] Field of Search ............ 358/84, 86, 349; 379/92; 455/2, 4, 5; 380/20

[56] References Cited

U.S. PATENT DOCUMENTS

| | | |
|---|---|---|
| Re. 31,735 | 11/1984 | Davidson .................. 380/20 X |
| 3,790,700 | 2/1974 | Callais et al. ................... 358/84 |
| 3,886,302 | 5/1975 | Kosco ............................ 380/20 |
| 4,277,651 | 7/1981 | Fisher, II et al. . |
| 4,484,217 | 11/1984 | Block et al. .................. 358/84 |
| 4,536,791 | 8/1985 | Campbell et al. ............ 358/86 X |
| 4,584,602 | 4/1986 | Nakagawa .................... 358/84 |
| 4,630,108 | 12/1986 | Gomersall .................... 358/84 |
| 4,686,564 | 8/1987 | Masuko et al. ............... 358/86 |
| 4,710,955 | 12/1987 | Kauffman .................. 358/84 X |
| 4,739,510 | 4/1988 | Jeffers .......................... 358/84 |
| 4,792,284 | 12/1988 | Nussrallah et al. ........... 358/86 |

Primary Examiner—Jin F. Ng
Assistant Examiner—Stella L. Woo
Attorney, Agent, or Firm—Banner, Birch, McKie & Beckett

[57] ABSTRACT

An impulse pay-per-view system wherein a number of downloadable transactions may be utilized to effect increased control and diversity is disclosed. A preview time/free transaction permits a system subscriber to view portions of a pay-per-view event without purchasing the event. A security transaction sent while a pay-per-view event is active may be used to prevent a subscriber from receiving events which have not been purchased. A telephone number transaction may include a special character representing an instruction to pause between the dialing of selected digits. A viewer statistic transaction may be use dot instruct a subscriber to record the channel he is viewing. Finally, a subscriber may pre-buy pay-preview events in order to facilitate VCR recording of the events while he is asleep or away from home.

48 Claims, 3 Drawing Sheets

FIG. 2

| E0 | E1 | E2 | E3 | CH0 | CH1 | CT0 | CT1 | F | SL |

FIG. 4

| A0 | A1 | A2 | A3 | A4 | I0 | I1 | I2 | I3 |

FIG. 5a

| A0 | A1 | A2 | A3 | A4 | P0 | P1 | P2 | P3 | P4 | P5 | P6 | P7 | P8 | P9 |

FIG. 5b

| P0 | P1 | P2 | P3 | P4 | P5 | P6 | P7 | P8 | P9 | P10 |

FIG. 6

| TL0 | TL1 | L0 | L1 |

FIG. 7

| 1 | 0 | 0 | 0 |

5,003,384

SET-TOP INTERFACE TRANSACTIONS IN AN IMPULSE PAY PER VIEW TELEVISION SYSTEM

BACKGROUND OF THE INVENTION

This invention relates generally to the field of cable television systems and, more particularly, to a system for reporting back to a centrally located office, the viewing of certain premium programming for which a subscriber is billed in addition to his regular monthly subscription fee. This practice is popularly referred to as "pay-per-view" (PPV). More specifically, the subject invention relates to the most desirable type of PPV, known as "impulse pay-per-view" (IPPV). An IPPV system allows a subscriber to order a program at the last minute.

Early PPV systems worked with one way addressable set-top terminals (STT). A subscriber who wished to order a PPV event did so by calling an operator and orally placing his order. The operator entered the order into a computer, which then transmitted authorization to the subscriber's set-top terminal.

This system suffers from the requirement of using the telephone and a human operator. This increases the cost of handling PPV requests, and effectively eliminates IPPV as a viable service since only a limited number of people are able to call in during the last minutes before a program begins. Therefore, the majority of people desiring to view a program must order it long before it begins.

Some prior art systems exist which purport to solve the IPPV problem. One such system employs a two-way cable television (CATV) plant, in which the set-top terminal may be equipped for transmitting a signal back to the headend ("upstream transmission") on a suitable frequency, such as between 5 MHz and 30 MHz. The terminal transmits information as to what programs are being or have been viewed to a computer at the headend. This system suffers from the fact that no protocols have been developed which operate efficiently in an enviroment of an exceedingly large number of set-top terminals who "speak" very little, but who must be serviced quickly when they do speak. Further, two-way CATV plants have proved difficult to maintain with adequate integrity to permit reliable return transmission, and the cost of the plant is excessive compared to the revenues to be gained from IPPV.

Another system uses credits downloaded to the terminal, and then makes deductions against the credits when a program is viewed. At the end of the month, certain alpha-numeric characters are displayed, indicating programs viewed. The subscriber writes these characters on a card which is mailed to the CATV operator. This system suffers from excessive delay in reporting programs watched, a limited number of programs which can be viewed (due to the limited number of characters a subscriber can be expected to write down), and the possibility of unrecoverable errors in transcription.

A similar system is disclosed in U.S. Pat. No. 4,484,217 to Block. In this system, credits are downloaded to the terminal and deductions are made when programs are viewed. An indicator informs the subscriber that the stored credit has expired or is low. The headend office, upon receipt of payment, will add credits to the subscriber's terminal and the indicator will be extinguished. In this system the subscriber must pay in advance and may miss programs due to delay in crediting his account.

An impulse pay-per-view system is disclosed in commonly assigned U.S. Pat. No. 4,792,848, herein incorporated by reference.

SUMMARY OF THE INVENTION

It is an object of the present invention to effect increased control and enhance the diversity of an impulse pay-per-view system.

This object maybe achieved in a control apparatus for an individual subscriber in a cable television system which distributes a television signal from a headend office to a plurality of subscribers, the television signal including a plurality of channels and a plurality of downloadable transactions. At least one of the channels carries pay-per-view events. The control apparatus includes a receiver for receiving television signals, a detector for detecting any downloadable transactions contained in the television signals which are addressed to the corresponding subscriber, and a microprocessor for processing the transactions detected by the detector. A selector is responsive to subscriber supplied signals for selecting pay-per-view events carried over one of the plurality of channels. A memory is coupled to the microprocessor and the selector for storing billing information regarding selected pay-per-view events. A transmitter is coupled to the storage means for transmitting the stored billing information. The apparatus further includes a device responsive to a downloadable transaction which permits the subscriber to receive a selected pay-per-view event for a predetermined preview time period before the subscriber must supply a signal to generate billing information. The apparatus includes another device responsive to the downloadable transaction which further permits the subscriber to receive the event for a predetermined free time period time before supplying a signal to generate billing information.

The present invention also concerns a control apparatus for downloading transactions to a plurality of subscribers. This apparatus includes a downloadable transmitter which transmits the downloadable transactions to the plurality of subscribers. A processor processes instructions from a system operator. A preview time generator, responsive to the system operator, generates a downloadable transaction to permit the plurality of subscribers to receive an event for a predetermined preview time period before requiring the subscribers to purchase an event. The apparatus also includes a free time generator responsive to the system operator which generates a downloadable transaction which permits the plurality of subscribers to further receive the event for a predetermined free time period before requiring the subscribers to purchase the event.

The present invention is further concerned with a method of pre-buying a selected event which is being shown on one of a plurality of channels. First, a predetermined key sequence is actuated, the key sequence generating information corresponding to a selected event on one of the plurality of channels. The information thus generated is then transmitted to an event module. The generated information is stored in a memory associated with the event module and subsequently compared with information contained in a downloadable transaction. A subscriber is authorized to view the selected event if the stored information matches the information contained in the downloadable transaction.

Billing information corresponding to the selected event is generated and stored in the memory.

The present invention is further concerned with a method of instructing a plurality of subscriber modules to report over a public telephone network billing information associated with the viewing of selected events on the plurality of channels. A transaction is downloaded to the subscriber module which includes a telephone number corresponding to a storage means for storing billing information associated with the plurality of subscribers. Included in this transaction are instructions adapted to effect a predetermined delay period between the dialing of selected digits.

The present invention is further concerned with a method of transmitting billing information associated with the viewing of selected events on a plurality of channels from a subscriber module to the headend office. A telephone number is loaded in a memory associated with the module in response to information contained in a first transaction downloaded from the headend office. This telephone number is dialed in response to instructions contained in a second transaction downloaded from the headend office. In response to instructions contained in the first downloaded transaction, pauses of a predetermined period are inserted between the dialing of selected digits.

The present invention is also concerned with a control apparatus for an individual subscriber designed to protect against theft of services. The apparatus includes a receiver for receiving television signals, a detector for detecting downloadable transactions in the television signal which are addressed to the corresponding subscriber, and a microprocessor for processing transactions detected by the detector. A selector is responsive to subscriber supplied signals to select events carried over the plurality of channels. A memory is coupled to the microprocessor and the selector for storing billing information regarding the selected event. A transmitter coupled to the memory transmits the stored billing information over a telephone network. A security counter responsive to a downloadable transaction from the headend which is sent only while an event is active prevents the subscriber from receiving an event unless the transaction is received.

The present invention is further concerned with a control apparatus for downloading transactions to a plurality of subscribers. The apparatus includes a downloadable transmitter for transmitting the downloadable transactions to a plurality of subscribers and a processor for processing instructions from a system operator. A security generator responsive to the system operator generates a downloadable transaction only while an event is active which prevents a subscriber from receiving an event unless the transaction is received.

The present invention is further concerned with a method of generating viewer statistics. Initially, a first downloadable transaction is addressed to at least one subscriber module with instructions to store the channel number corresponding to the channel being watched by the subscriber in an associated storage device at the moment the first downloadable transaction is received. A second downloadable transaction is addressed to the subscriber module with instructions to the module to initiate telephone communication with the headend office. The second transaction includes instructions to the module to transfer the stored channel number to the headend and to write a predetermined character in the memory as an indication that the channel number has been transferred.

Finally, the present invention is concerned with a method of processing viewer statistics at a subscriber module. Initially, a first downloaded transaction is received with instructions to store the channel number corresponding to the channel being watched by the subscriber. This channel number is stored in a storage device. In response to a second downloaded transaction, the module dials into the public switched telephone network to establish communication with the headend office. The stored channel number is transferred to the headend office and a predetermined character is written to the storage device as indication that the channel number has been transferred.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

FIG. 2 is a schematic representation of the bit patterns in an authorization transaction.

FIG. 4 is a schematic representation of bit patterns in a pre-buy transaction downloaded by the system manager.

FIG. 5a and 5b are schematic representations of the bit patterns in an addressable and a global load telephone number transaction, respectively.

FIG. 6 is a schematic representation of bit patterns in a data request transaction.

FIG. 7 is a schematic representation of a bit patterns in a viewing statistic transaction.

DETAILED DESCRIPTION OF THE PREFERRED EMBODIMENT

Figure 1:
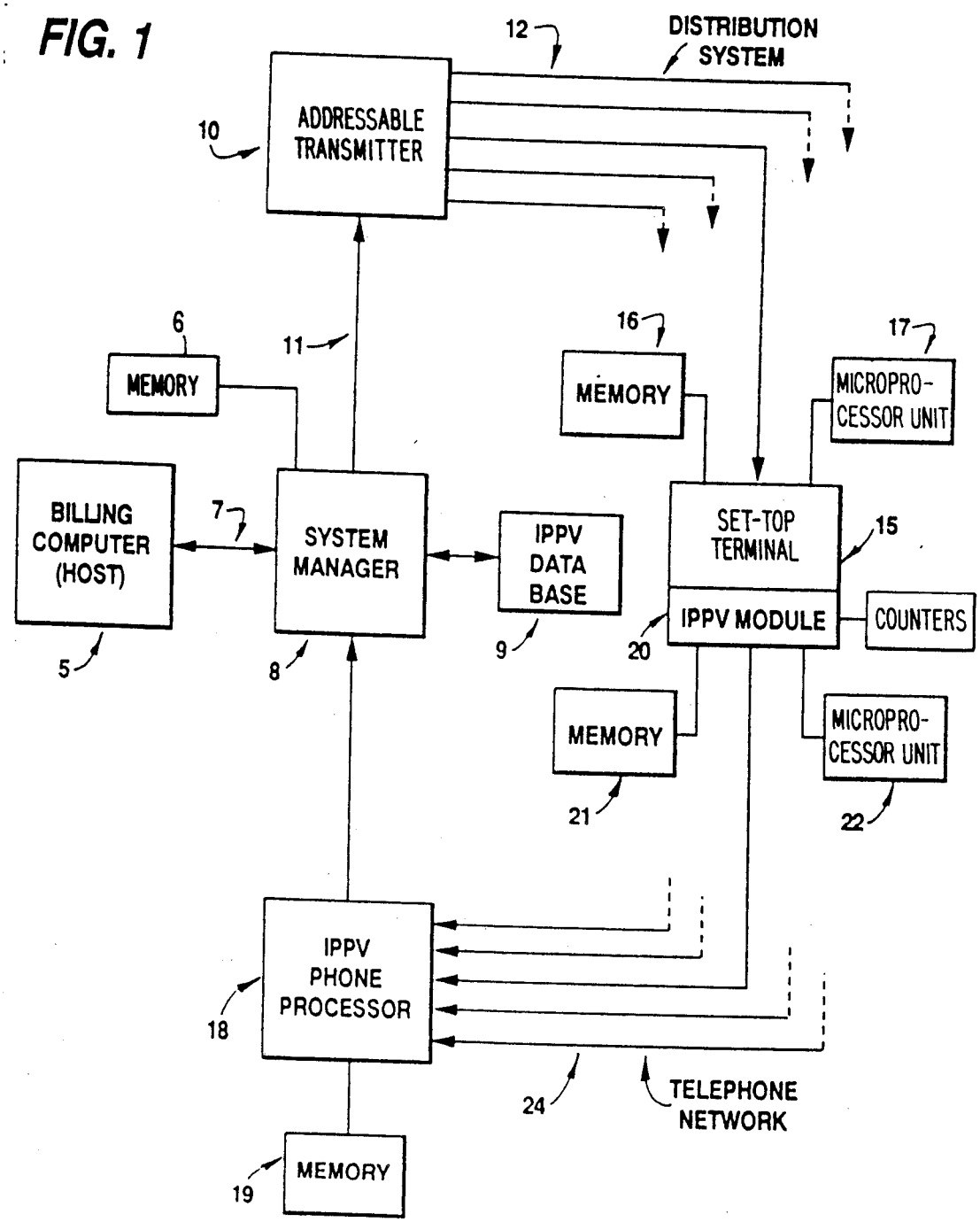
FIG. 1 is a block diagram representing the overall configuration of the impulse pay-per-view system according to the present invention.

An overview of the addressable impulse pay-per-view system according to the present invention will be given with respect to FIG. 1. In what follows, hexadecimal notation 0-F will be used to denote data values. The system includes a billing computer or host 5 which comprises an essential part of an addressable cable system having impulse pay-per-view capability. Billing computer 5 records and maintains records for each cable subscriber. These records may contain information such as the subscriber's name, address and telephone number, the type of equipment the subscriber has in his possession, and which pay services the subscriber is authorized to view. With particular regard to both impulse pay-per-view and pay-per-view programming, billing computer 5 functions to control IPPV service, maintain IPPV access codes, control IPPV event billing, and maintain PPV event and preview definitions. Typically, the cable operator owns the billing computer, leases the equipment from a vendor who specializes in this type of equipment, or shares computer time on a machine owned by one of these billing vendors.

Billing computer 5 is interfaced to a system manager 8. System manager 8 controls the addressable cable system. Typically located at or near the billing computer 5, system manager 8 maintains a list of all the addressable set-top terminals in the cable system as well as those services which each terminal is authorized to receive. System manager 8 also defines and maintains the parameters selected by the cable operator for each system. These parameters may include the frequencies associated with each channel in the system, which channels are being scrambled, the security features of the system, and the system time. Additionally, system manager 8 is responsible for the authorization and deauthorization of pay-per-view events in the system.

A computer of system manager 8 will have a disk and controller dedicated to the storage of IPPV information. A memory resident program of system manager 8 will read the IPPV transactions, uploaded from the IPPV modules in the system. Each IPPV transaction will be stored in data base 9 until it is retrieved by billing computer 5. An operator of the system manager will have the ability to access the IPPV data base 9 and display the event identifiers (IDs) of the events that have been purchased by the converter. System manager 8 will upload the transaction data to billing computer 5 in response to an Initialize IPPV Upload command. The data returned to the billing computer will be grouped by the identification of a particular set-top terminal or converter, that is, all event IDs associated with a particular converter serial number will be returned together.

The system manager will also maintain a table of viewing statistics in memory 6 and on the IPPV disk. System manager 8 will further be able to direct all IPPV-equipped set-top terminals to record the channel to which each is tuned by transmitting a viewing statistic transaction (discussed in detail below) via addressable transmitter (ATX) 10. This information is recorded in the IPPV module's memory and is transmitted along with the IPPV transaction data during the next interrogation of the module. Thus, each time an IPPV transaction is received from an IPPV module, a table location corresponding to the recorded channel number contained in the IPPV transaction will be incremented. A value of '00', for example, may be used to indicate that a set-top terminal was off when the viewing statistic transaction was transmitted by the system manager. A value of 'FF' may be used to indicate that a set-top has already transferred its channel information to the system manager. The system manager will thus have the capability to print a summary report of viewing statistics for each channel. The system manager will also clear the table containing the viewing statistics whenever a new viewing statistic transaction is transmitted.

Both the IPPV access code and IPPV service code will be maintained for each IPPV equipped converter in the system manager converter data base. System Manager 8 will also maintain data elements for each headend in its data base. These data elements may include the telephone number for each IPPV module transfer, IPPV "HELP" barker channel, IPPV "FULL" barker channel, call back limit, security nibble, host time out value, IPPV time out-counter, transfer key, and IPPV ID range. Briefly, the "FULL" barker channel refers to an STT Status which specifies the channel to be tuned by the IPPV Module when an attempt is made to purchase an IPPV event and there is no room in the IPPV Module's event purchase table to store the event purchase data. The security nibble refers to a transaction used to maintain the security of the IPPV return data path. The value of this field may be sent to the IPPV Module by the ATX during a define telephone number transaction described below. Each time the IPPV Module calls the IPPV phone processor, this value is included in the data returned. The system manager can then compare the value obtained from the IPPV Module with the value being transmitted by the ATX to detect possible data security violations. The host time-out refers to a transaction which specifies the amount of time an IPPV Module will wait for a response from the IPPV phone processor. If no response is received, the IPPV Module will consider the call to be unsuccessful and retry at a later time. Transfer key refers to a transaction which is used to control the number of IPPV modules that will call the IPPV phone processor. The range of valid values may be, for example, 0 to 7 and F, where F indicates a global request and any other value causes only those converters to call for which the least significant 3 bits of the digital address matches the value of the transfer key. The IPPV ID range refers to a transaction which specifies the number of digits to be used by the IPPV module when entering or displaying the IPPV Event ID for an IPPV Pre-Buy.

System manager 8 will control IPPV module telephone usage by transmitting an IPPV request data transaction to ATX 10. System Manager 8 will accept host link commands to allow the host computer 5 to add, modify and delete PPV event definitions. An operator of the system manager will also be able to display and update this data. System manager 8 will schedule the global authorization and deauthorization of PPV events. For each PPV event, the event ID, free time and preview time (discussed in detail below), purchase window and event slot will be transmitted along with the authorizations.

The addressable transmitter (ATX) 10 is a device used to receive commands generated by system manager 8 and transmit them on a dedicated data channel in the cable system in a format recognizable by the addressable set-top terminals. Typically, one ATX is located at each cable headend. ATX 10 will receive IPPV transactions from system manager 8 and format the appropriate commands for transmission to the IPPV equipped converters.

Each subscriber in the addressable cable system is provided with a set-top terminal (STT) 15 by the cable operator as schematically indicated in FIG. 1. STT 15 allows the subscriber to tune and descramble the services that he has requested from the cable system operator. Each STT 15 contains a unique identifier, or address, for example, a manufacturer's serial number, which allows the cable operator to send commands via ATX 10 to an individual STT. These commands are called "addressable" commands. The STT's are also capable of receiving "global" commands heard by all the STT's in a cable system. Those subscribers who are authorized to purchase impulse pay-per-view events are issued set-top terminals which have been equipped with an IPPV module 20. Module 20 allows the subscriber to authorize his STT to receive a pay-per-view event, store the data associated with the purchase of that event in memory 21, and transmit that stored data to the cable operator via the telephone network 24. The subscriber is then billed for the events that he has purchased. IPPV module 20 receives the IPPV transactions from ATX 10 via distribution system 12 and stores the IPPV parameters in non-volatile memory (NVM 21). The IPPV module also functions to authorize IPPV events and record IPPV activity in the NVM 21. Module 20 transfers IPPV data to the system manager 8 via phone processor 18 when a "request IPPV data" command is received. Upon successful transmission, the IPPV module will clear the events watched table maintained in NVM 21.

The interfaces between these various components will now be discussed. Billing Computer or Host 5 sends data to system manager 8 via a serial interface schematically indicated at 7. Host 5 acts as the master and system manager 8 acts as a slave device. That is, the Host 5 sends a command to the system manager 8, the system manager processes the command and sends a response to the Host, and the sequence is repeated. The system manager may not initiate a conversation, but can only respond to commands from the Host. There are generally three types of commands associated with the IPPV System of the present invention which are sent via interface 7. The first type includes set-top terminal commands. These commands are used to configure a subscriber's STT for Impulse PPV. They allow the Host 5 to authorize a subscriber for IPPV purchases and define the "access code" that must be entered by the subscriber in order to purchase an IPPV event. The second type of commands includes pay-per-view commands. These commands are used to define the characteristics of the pay-per-view events being shown in the system, including the start and stop times, event ID, channel, amount of free time, and the period in which each event is available for purchase. System Manager 8 is thus responsible for authorizing and deauthorizing the PPV events at the appropriate times and controlling the characteristics of each event. Finally, the third type of commands include upload commands. These commands are used by the Host 5 to retrieve the data that has been collected by the system manager 8 from the plurality of Impulse PPV Modules 20 via phone processor 18. This data is transmitted to the system manager by the IPPV module 20 via the telephone network 24 and contains a record of which PPV events have been purchased by each subscriber. The Host uses this data to bill the subscribers for each PPV event purchased.

The system manager 8 transmits data to the ATX 10 via a serial interface in which the system manager 8 acts as the master and the ATX 10 acts as the slave device. There are generally four types of commands associated with the IPPV System which are sent via this interface. First, set top commands are sent which are used to configure an STT for Impulse PPV. They allow the system manager to authorize a subscriber for IPPV purchases, and define the "access code" that must be entered in order to purchase an IPPV event. Authorize Pay-Per-View Event commands are used by the system manager to start PPV events in the system and to define the characteristics of the events, including the event ID, channel, amount of free time and the purchase window. Purchase window refers the period in which a subscriber is allowed to purchase the event. The purchase window always begins at the start time of an event. The authorize IPPV/PPV event transaction authorizes the channel corresponding to a PPV event in all converters in which the specified PPV identification code has been loaded. The transaction also authorizes the channel corresponding to an IPPV event in all converters with IPPV modules that have requested the event. It also defines the amount of free time for the event. Deauthorize Pay-Per-View Event commands are used by the system manager to stop PPV events in the system. The deauthorize/purge IPPV/PPV transaction deauthorizes the channel corresponding to a PPV event in all converters in which the specified PPV identification code has been loaded. In addition, the PPV identification code is purged from every converter. This transaction also deauthorizes the channel corresponding to an IPPV event. Finally, IPPV System Parameter commands are used to configure the IPPV modules for IPPV operation. They allow the cable operator to define IPPV help and barker channels, the telephone number to be used by the IPPV modules to transfer data to the system manager, and to define the method used by the IPPV modules to determine when to phone the system manager and transfer the data associated with each PPV event purchased. The request data from IPPV module transaction directs an IPPV module to initiate a phone call to the system manager to transmit IPPV data stored in the module. The request viewing statistics transaction directs an IPPV module to store the channel to which it is tuned when this transaction is received. The load telephone number transaction defines the telephone number to be used by the IPPV module to transfer data to the system manager. The IPPV event load transaction loads a PPV event ID into an IPPV enabled converter.

ATX 10 transmits data to the IPPV module 20 via a dedicated FM data channel in the cable television distribution system 12. This channel, known as the "data carrier", is used to transmit both "addressable" commands intended for a particular IPPV module and "global" commands intended for all IPPV modules in the system. Alternatively, the transaction data may be inserted into the television signal itself, such as in the vertical blanking interval. Each addressable STT contains a receiver that is listening to the commands sent down this data channel. This data is available to the IPPV module in every IPPV-equipped STT. (An IPPV module may be designed as a plug-in module for reception into a set top terminal at an appropriate interface. Alternatively, the IPPV module circuitry may be incorporated within the circuitry of the set top terminal, thereby promoting efficiencies of operation. For example, the microprocessor of the STT may be appropriately designed to control both a billing memory normally associated with the module and an IPPV event memory of the STT). This is a one way data path, i.e., the IPPV module 20 cannot use this data channel to send data back to the ATX 10. Also, this data channel is available to the STT at all times as long as the incoming cable is connected, no matter what video/audio channel the STT is tuned to. The commands sent via this interface are similar to those sent via the system manager-ATX interface. Set-top commands are used to configure an IPPV-equipped STT for Impulse PPV purchases. They enable the module for IPPV purchases and define the "buy code" that must be entered in order to purchase an IPPV event. Authorize Pay-Per-View event commands are sent from the ATX 10 to start PPV events in the system and to define the characteristics of the events including the event ID, channel, amount of free time, and the purchase window. Each of these commands must be transmitted at the beginning of each PPV event, as well as during the event. Deauthorize Pay-Per-View Events commands are used to stop PPV events in the system. These commands must be transmitted at the conclusion of each PPV event. IPPV System Parameter Commands are used to configure the IPPV modules for IPPV operation. They allow the cable operator to define IPPV help and barker channels, the telephone number to be used by the IPPV modules to transfer data to the system manager, and to define the method use by the IPPV modules to determine when to phone the system manager and transfer the data associated with each PPV event purchased. Finally, Time of Day commands define the date and time to the system.

The IPPV module is interfaced to the system manager via an IPPV phone processor 18. The telephone network interface between each IPPV module and the system manager will be used for a single transaction, i.e. to upload viewing statistics and IPPV program purchases to the system manager. The IPPV modules 20 transmit data to the system manager 8 via the telephone network 24 and phone processor 18. The system manager periodically instructs the IPPV modules via the ATX 10, to use the subscriber's telephone line to send data associated with the IPPV events purchased by the subscriber with the IPPV module. For each event purchase stored in the module, the event ID and time of purchase are transferred to the system manager. The IPPV module is connected via the telephone network 24 with a phone processor 18 which manages calls initiated by set-top terminals equipped with IPPV capability. It stores the IPPV event information contained in these calls in nonvolatile memory 19 until the information can be uploaded to the system manager or other control computer. After receiving the IPPV information the phone processor 18 transmits the proper security codes to clear IPPV events from the set-top terminals.

The phone processor 18 functions as a peripheral device to the system manager 8. Each phone processor monitors up to eight separate telephone lines for incoming calls. As the calls arrive, the phone processor answers the proper telephone line and transmits a transaction to the set-top terminal. Upon successful reception of that transaction, the set-top terminal then transmits all stored event information to the phone processor. If the information is received error-free, the phone processor transmits a transaction which the set-top terminal must decode to clear the event information. After the event data is received from the set-top terminal, it is stored in a non-volatile memory array in phone processor 18 which preserves the information through any loss of power.

Periodically, the phone processor 18 attempts to upload to the system manager 8 with a buffer packet message. The buffer packet message contains the stored event information and/or several status information fields. If the phone processor is unable to transfer the information, due to power loss or serial link failure, the phone processor non-volatile memory 19 fills up and the phone processor 18 will not accept any additional telephone calls until memory space becomes available.

When the system manager receives the buffer packet from the phone processor, it verifies a checksum. If the checksum is incorrect, a command is sent to the phone processor which causes the buffer packet to be retransmitted. If the checksum is correct, the associated data is permanently removed from the memory of phone processor 18. The system manager must save its data on a disk or in some non-volatile memory before sending the command to clear the data from the phone processor in order to avoid the irrevocable data loss in the case of power failure.

The present invention is specifically concerned with a number of unique set-top transactions which may be sent via ATX 10 to effect increased control and enhance the diversity of an impulse pay-per-view system. A number of these transactions were mentioned briefly above and will be discussed in greater detail below.

The Authorize IPPV Event transaction will be discussed first with reference to FIG. 2. FIG. 2 illustrates bit patterns which may be included in this transaction. E0-E3 represent the IPPV event ID. CH0-CH1 represent the associated channel. F represents the free time. CT0-CT1 represent a counter reset value. SL represents a slot value. An additional bit pattern (not shown) may be included to specify the purchase window. As noted above, this authorization transaction authorizes the channel corresponding to a PPV event in all converters in which the specified PPV identification code has been previously loaded, as well as authorizing the channel corresponding to an IPPV event in all converters with IPPV modules that have requested the event. This transaction, as indicated, includes a field that may be used to control what are called preview time and free time. Preview time is defined as a period or window of time at the beginning of an event during which the event or a preview of a future event may be watched without being purchased. Free time is defined as a cumulative length of time during an event that the event may be watched without being purchased. Free time may be used at any time during the event. In a preferred embodiment, preview time may range from 0 to 255 minutes while free time may range from 0 to 14 minutes. For example, suppose the IPPV event consists of a movie with a starting time of 8:00 p.m. and an ending time of 10:00 p.m. The system operator may designate a block of time, say from 8:00-8:30, during which the movie may be viewed without the viewer having to purchase the movie. This would constitute the preview time. The system operator may elect to permit additional viewing of the movie for a total of fourteen minutes during the event time. Thus, after the preview time has expired, a total of fourteen minutes of the event may be viewed. An example of how this free time may be used is from 8:30-8:34, 9:10-9:15, and 9:45-9:50. There is no restriction on how the free time is used as long as it does not exceed its predetermined value, in this case, fourteen minutes.

The predetermined value or sum of free time is set by selecting a value for the free time bit pattern F. This value is stored in a non-volatile memory of the IPPV module. Once the subscriber has tuned to a channel on which a IPPV event is being shown, a counter counts down until the free time has elapsed. When the counter equals zero, the event must be purchased to enable further viewing. Thus, each subscriber module has a plurality of counters corresponding to the number of pay channels. A preferred embodiment includes sixteen counters. Fixing the slot bit pattern SL tells the module which of the sixteen counters is to be loaded with the free time. In an alternative embodiment, a single counter of the IPPV module microprocessor is operated by a clock associated with the microprocessor. A memory cell is preferably associated with each channel on which an IPPV event may be shown. The memory cell stores the IPPV event free time which is periodically stepped or decremented responsive to the counter until free time has lapsed for the associated IPPV event channel and, the stepping or decrementing occurs only when the IPPV event on that channel is being displayed and only after preview time has expired. The slot bit pattern SL may be used to tell the module which memory is to be loaded with the free time. It is important to note that free time is never used up during preview time. During preview time, the free time counter associated with the particular pay channel is constantly reset through receipt of the authorization transaction to the total amount of free time predetermined by the system operator for that event. After preview time, the free time bit pattern F is set to a predetermined value, F(hex) for example, which is a flag to the module that preview time has expired. The free time counter is then allowed to count down or decrement whenever the subscriber is tuned to that particular channel. The counter is decremented on the average every sixty seconds. The actual time is varied slightly in order to defeat attempts at pirating. Both free time and preview time are configurable and represent global commands on a per event basis, which may be downloaded by the system manager.

A security counter controls the length of time that an impulse pay-per-view module will allow the cable TV subscriber to view an impulse pay-per-view channel without receiving an IPPV authorization transaction. When that length of time has elaspsed, the impulse pay-per-view module will deauthorize all impulse pay-per-view channels and "close out" all impulse pay-per-view events that are in progress. This security feature is a method to prevent subscribers from purchasing an event, trapping the data stream, and watching subsequent events.

When an impulse module buys an event, it will authorize that channel until the event is over. In order to effect such channel authorization, the module writes to the set-top's channel authorization memory. When the event is over, a deauthorization transaction is sent to the impulse module to effect channel deauthorization. However, in the past, subscribers have brought a number of premium channels and attempted to trap the deauthorization transaction so as to retain use of the premium channels indefinitely. The present invention defeats such attempts at pirating by using the authorization transaction which starts an event and which is sent approximately every five hundred milliseconds. A counter in the module must be reset by one of these authorization transactions within a predetermined period of time, or those channels will be deauthorized. Absence of this transaction will shut down the IPPV channels. The counter is set through the bit pattern values CT0-CT1. The bit values specify the period of the IPPV timer contained in each IPPV module. The timer period is the maximum amount of time that an IPPV module will allow a PPV channel to remain authorized without receiving an authorization transaction from the ATX. The range of valid values in the preferred embodiment is from 0-255 in 15 minute increments. Thus, the time is controllable in fifteen minute increments up to sixty-four hours. The counter may be disabled by setting the bits 0 if there is no concern about piracy.

Another feature of the IPPV system of the present invention is the ability to pre-buy a pay-per-view event. Pre-buys are useful for VCR recording of events when the subscriber is not home or if a subscriber is asleep. This feature of the present invention is unique because of the ability to program the pre-buy either from the IPPV module via a hand-held remote or the set top or from the headend in response to an order via the host billing system.

Figure 3:
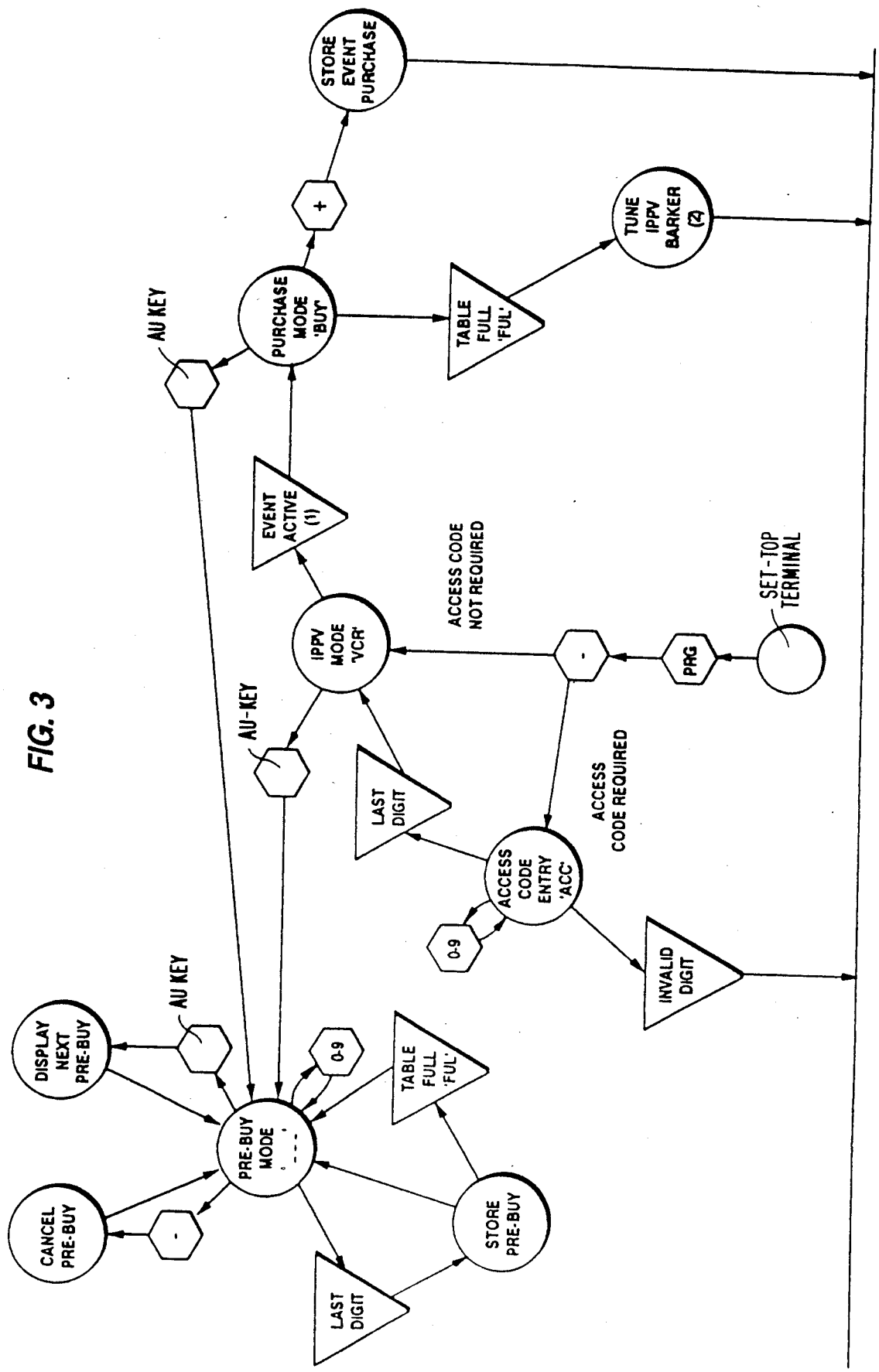
FIG. 3 is a state diagram illustrating the method of pre-buying an IPPV event from a hand-held remote or set-top.

The process for performing a pre-buy with a Scientific Atlanta Set-top Model 8550 or 8585 is illustrated in FIG. 3. With the converter turned on, the subscriber depresses the keyboard keys "PRG" and "-" of his hand-held remote control. If an access code is required to purchase programming, this must be entered before the converter will enter the IPPV mode and display "VCR" using LED elements. An improperly keyed access code denies one the ability to purchase programming. Once in the IPPV mode, depression of the "AU" key creates access to the pre-buy mode. Once in the pre-buy mode, the subscriber simply enters the three or four digit event ID number of the program he wishes to purchase. The ID numbers may be provided in a programming guide, for example. After the last digit of each program ID has been entered, it is stored in nonvolatile memory 21 of the module. As indicated, it is possible to step through the list of programs which have been pre-bought with an opportunity to cancel any event which the subscriber no longer wishes to view or which have erroneously entered. Although the above description has been given with respect to a particular set-top model, it will be apparent to those of ordinary skill that similar procedures may be employed on different set-tops and the invention should not be understood as limited in this respect.

Subsequently, when the system manager sends an authorization transaction as described above with information that a particular event is running or is authorized, the module, upon receipt of that transaction, will search the nonvolatile memory 21 containing the pre-buys for the event ID of that particular program. If the particular event ID is in fact contained within the nonvolatile memory, the module will purchase the event for the customer. This is an advantage over some prior art systems which require the additional inconvenient setting of times via a hand-held remote control in order to activate the descrambler at a particular time.

In addition, the present system is also adapted to download an IPPV pre-buy in response to a customer's phone request for a PPV event. As schematically indicated in FIG. 1, a converter contains a set-top microprocessor 17 which processes pay-per-view transactions and an impulse pay-per-view microprocessor 22 which processes impulse pay-per-vew transactions. Pay-per-view events are authorized by the set-top microprocessor 17. If an event is both a pay-per-view event and an impulse pay-per-view event, as frequently happens, and a subscriber buys the event as a pay-per-view event, the microprocessor 22 in the IPPV module would normally cut off viewing after the allocated free time had expired. In order to overcome this, when the system manager is notified that a subscriber wishes to purchase a pay-per-view event and it is determined that this subscriber also has an IPPV module, a transaction as in FIG. 4 is downloaded to the IPPV module which authorizes it to purchase the event. The transaction includes the converter address (bit patterns A0-A4) and the IPPV Event ID (bit patterns I0-I3). This transaction, as in the customer prebuy, loads the Event ID into the module's nonvolatile memory 21. It is important that the system manager maintains a record of this authorized pre-buy to prevent the record of the impulse purchase from being sent to the billing computer. Such a transfer would result in the subscriber being billed twice for the same event.

In order to report the events watched to the system manager, the IPPV module must be able to dial into a telephone network. Thus, the IPPV module of the present invention possesses the ability to dial a downloaded, stored up to eleven digit telephone number. In place of a digit, a special character may be used to signify a predetermined delay between the preceding and succeeding digits. This is particularly useful when it is necessary to dial out of a local private branch exchange. A typical load telephone number transaction is included in FIG. 5a and 5b. This transaction may be global or addressed. FIG. 5a includes bit patterns A0–A4 which represent the address of the converter. Bit patterns P0–P10 represent the downloaded telephone number. By inserting a special character, hex A for example, the module may be instructed to pause for a predetermined time period between the preceding and succeeding digits. In the preferred embodiment, the predetermined time period is 2.5 seconds. FIG. 5b illustrates a similar global command which does not include address bit patterns A0–A4.

In order to effect a call in, the module must have downloaded to it certain parameters. As noted above, after dialing the phone processor, the phone processor sends a signal to the module indicating it has gone off hook. The module will then send its data. Afterwards the phone processor sends a signal indicating it has received the data. The module must know (a) how long to wait for receipt of the first signal, (b) how many times it should attempt to call back, and (c) when it should start or stop calling back. These parameters may be addressed to a particular set-top or globally.

These parameters may be sent as part of the transaction shown in FIG. 6. The bit patterns TL0–TL1 represent the call back attempt limit and may include values from zero to FF, with zero used to instruct the module to stop calling. L0–L1 represent the host time out or how long the module will wait after dialing the last digit for the first signal from the phone processor. If no response is received, the IPPV module will consider the call to be unsuccessful and retry at a later time. The range of valid values is zero to 255, with a resolution of 2.5 seconds.

The impulse pay-per-view system also has the ability to request the impulse pay-per-view module to record the channel that is being watched and report that information during the normal IPPV call back. If the cable operator wishes to find out what his subscribers are watching, a transaction may be sent similar to that shown in FIG. 7. All set tops with an IPPV module will record the channel being watched upon receipt of this transaction. After the module has called in to report its viewing statistics, a third bit is stored in the nonvolatile memory to indicate that the statistics have already been reported. A value of '00' may be used to indicate that a set-top was off when the Viewing Statistic Transaction was transmitted and a value of 'FF' may be used to indicate that a set-top has already transferred its channel information. Thus, if that particular IPPV module calls in twice before the cable operator has had a chance to calculate the statistics, the statistics of that particular IPPV module are not duplicated.

It is to be understood that the invention is not limited to the illustrations described and shown herein which are deemed to be merely illustrative of the best modes of carrying out the invention. The invention rather is intended to encompass all such modifications which are within its spirit and scope as defined by the claims.

We claim:

1. A subscriber terminal apparatus for controlling subscriber viewing in an addressable television system, the subscriber terminal apparatus comprising:

receiving means for receiving a television signal comprising a plurality of channels, at least one of said channels carrying pay-per-view events which must be authorized for viewing by a subscriber;

detecting means for detecting data transactions from a headend which are addressed to the subscriber terminal apparatus;

microprocessor means for processing the data transactions detected by said detecting means;

authorization means responsive to subscriber-supplied signals for authorizing channels carrying pay-per-view events and for generating billing information related to said authorized pay-per-view events;

storage means coupled to said microprocessor means and said authorization means for storing the billing information;

transmitting means coupled to said storage means for transmitting the stored billing information to said headend;

preview time means responsive to a first data transaction of said data transactions which are addressed to the subscriber terminal apparatus for permitting the subscriber to view a selected pay-per-view event for a predetermined preview time period before authoization of said selected pay-per-view event; and free time means responsive to a second data transaction of said data transactions which are addressed to the subscriber terminal apparatus for further permitting the subscriber to view said selected pay-per-view event for a predetermined free time period before authorization of said selected pay-per-view event.

2. The subscriber terminal apparatus according to claim 1 wherein said free time means comprises: a plurality of counters, a single counter associated with each channel carrying pay-per-view events.

3. The subscriber terminal apparatus according to claim 2 wherein said plurality of counters comprises sixteen counters.

4. The subscriber terminal apparatus according to claim 2 wherein each of said plurality of counters may be set to a maximum of fourteen minutes.

5. The subscriber terminal apparatus according to claim 2 wherein the counter associated with a particular channel carrying a pay-per-view event is continually to a predetermined free time period during the preview time period.

6. The subscriber terminal apparatus according to claim 2 wherein the counter associated with a particular channel carrying a pay-per-view event is decremented when the subscriber selects the channel carrying said particular pay-per-view event.

7. The subscriber terminal apparatus according to claim 6 wherein each counter is decremented approximately every 60 seconds.

8. The subscriber terminal apparatus according to claim 1 wherein said predetermined free time period may be selectively allocated.

9. The subscriber terminal apparatus according to claim 1 wherein said preview time may range from 0 to 255 minutes.

10. The subscriber terminal apparatus according to claim 2 wherein said microprocessor means sets the respective counters in accordance with slot information contained in said first data transaction.

11. The subscriber terminal apparatus according to claim 1, the free time means further comprising memory means for storing the predetermined free time period.

12. The subscriber terminal apparatus according to claim 1, the free time means further comprising a counter for counting time lapsed of the predetermined free time period.

13. The subscriber terminal apparatus according to claim 1, the microprocessor means further processing said billing information and controlling pay-per-view event status.

14. The subscriber terminal apparatus according to claim 13, wherein the microprocessor means comprises a first microprocessor for processing the detected transactions and for controlling the pay-per-view event status and a second microprocessor, responsive to the first microprocessor, for processing the billing information.

15. The subscriber terminal apparatus according to claim 11, the free time means further comprising a counter for counting time lapsed of the predetermined free time period.

16. The subscriber terminal apparatus according to claim 15, the memory means of the free time means comprising a plurality of memories, a single memory being associated with each channel carrying pay-per-view events.

17. The subscriber terminal apparatus according to claim 1 wherein said data transactions are contained in said television signal.

18. The subscriber terminal apparatus according to claim 1 wherein said data transactions are transmitted on a dedicated data channel.

19. The subscriber terminal apparatus according to claim 1 wherein said transmitting means is responsive to a third data transaction to effect dialing into said telephone network.

20. The subscriber terminal apparatus according to claim 19 wherein said third data transaction includes a telephone number for dialing a storage means for storing billing information associated with a plurality of subscribers.

21. The subscriber terminal apparatus according to claim 20 wherein said third data transaction includes data for effecting predetermined pauses in the dialing of said telephone number.

22. The subscriber terminal according apparatus to claim 1 wherein said addressable television system comprises an addressable cable television system.

23. The subscriber terminal apparatus according to claim 1 wherein said transmitting means transmits the stored billing information to said headend office over a telephone network.

24. Headend apparatus for an addressable television system, the headend apparatus comprising:
    transmitting means for transmitting a television signal and a plurality of data transactions to a subscriber terminal apparatus, said television signal comprising a plurality of channels, at least one of said channels carrying pay-per-view events having respective predetermined active periods which may be selectively authorized for viewing by a subscriber so as to generate billing information;
    preview time control means for generating a first data transaction of said plurality of data transactions which are transmitted to the subscriber terminal apparatus for permitting the subscriber terminal apparatus to receive a subscriber selected pay-per-view-event for a predetermined preview time period before authorization of said selected pay-per-view event; and
    free time control means for generating a second data transaction of said plurality of data transactions which are transmitted to the subscriber terminal apparatus for permitting the subscriber terminal apparatus to further receive said subscriber selected pay-per-view event for a predetermined free time period before authorization of said selected pay-per-view event.

25. The headend apparatus apparatus according to claim 24 wherein said data transactions are contained in said television signal.

26. The headend apparatus according to claim 24 wherein said data transactions are transmitted on a dedicated data channel.

27. The headend apparatus according to claim 24 further comprising:
    storage means for storing billing information generated by a plurality of subscribers.

28. The headend apparatus according to claim 27 wherein said storage means is adapted to receive billing information over a telephone network.

29. The headend apparatus according to claim 24 further comprising:
    dial control means for generating a third data transaction for instructing the subscriber terminal to dial into a telephone network.

30. The headend apparatus according to claim 29 wherein said third data transaction includes a telephone number for dialing a storage means for storing billing information associated with a plurality of subscribers.

31. The headend apparatus according to claim 30 wherein said third data transaction includes data for effecting predetermined pauses in the dialing of said telephone number.

32. The headend apparatus according to claim 24 further comprising:
    deauthorization control means for generating a fourth data transaction transmitted only during the predetermined active period of pay-per-view event for deauthorizing an authorized channel after a predetermined period of time.

33. A subscriber terminal apparatus for controlling subscriber viewing in an addressable television system, the subscriber terminal apparatus comprising:
    receiving means for receiving a television signal comprising a plurality of channels, at least one of said channels carrying pay-per-view events which must be authorized for viewing by a subscriber;
    detecting means for detecting data transactions from a headend which are addressed to the subscriber terminal apparatus;
    microprocessor means for processing the data transactions detected by said detecting means;
    authorization means responsive to subscriber-supplied signals for authorizing channels carrying pay-per-view events having respective predetermined active times and for generating billing information related to said authorized pay-per-view events;
    storage means coupled to said microporcessor means and said authorization means for storing said billing information;
    transmitting means coupled to said storage means for transmitting the stored billing information to the headend; and deauthorization means responsive to a first data transaction of the data transactions which are addressed to the subscriber terminal apparatus which is sent only during the predetermined active time of a pay-per-view event for deauthorizing an authorized channel after a predetermined period of time.

34. The subscriber terminal apparatus according to claim 33 wherein said deauthorization means comprises: a security counter set in accordance with instructions contained in said first data transaction.

35. The subscriber terminal apparatus according to claim 34 wherein said security counter decrements in fifteen minute intervals.

36. The subscriber terminal apparatus according to claim 33 wherein said first data transaction is sent at predetermined times during the active time of a selected event.

37. The subscriber terminal apparatus according to claim 33 wherein said first data transaction is sent at regular intervals during the active time of a selected event.

38. The subscriber terminal apparatus according to claim 37 wherein said first data transation is sent approximately every 500 milliseconds during the active time of a selected event.

39. The subscriber terminal apparatus according to claim 34 wherein said first data transaction is sent at predetermined times during the active time of a selected event.

40. The subscriber terminal apparatus according to claim 34 wherein said security counter is reset in response to said first data transaction.

41. The subscriber terminal apparatus according to claim 33 wherein said security means may be selectively disabled.

42. Headend apparatus for an addressable teleision system, the headend apparatus comprising:
transmitting means for transmitting a television signal and a plurality of data transactions to a subscriber terminal apparatus, said television signal comprising a plurality of channels, at least one of said channels carrying pay-per-view events having respective predetermined active periods which may be selectively authorized for viewing by a subscriber;
deauthorization control means for generating and for transmitting a first data transaction of said plurality of data transactions which are transmitted to the subscriber terminal apparatus only during the predetermined active period of a pay-per-view event for deauthorizing an authorized channel after a predetermined period of time.

43. A method of generating viewer statistics in an addressable television system which distributes a television signal from a headend to a subscriber terminal apparatus including a storage device, said television signal comprising a plurality of channels, the method comprising the steps of:
transmitting a first data transaction to the subscriber terminal apparatus, said first data transaction including instructions to store in the storage device the channel number corresponding to the channel tuned by the subscriber terminal apparatus when said first data transaction is received;
transmitting a second data transaction to the subscriber terminal apparatus, said second data transaction including instructions to the subscriber terminal apparatus to initiate telephone communication with said headend, said instructions further including instructions for transferring the stored channel number to said headend and for writing a predetermined character to said storage device as an indication that the channel number has been transferred.

44. The method according to claim 43 wherein said first and said second data transactions are contained in said television signal.

45. The method according to claim 43 wherein said first and said second data transactions are transmitted over a dedicated data channel.

46. A method of generating statistics in a cable television system for distributing a television signal from a headend to a subscriber terminal apparatus including a storage device, said television signal comprising a plurality of channels, the method of comprising the steps of:
storing a channel number corresponding to the channel tuned by the subscriber terminal apparatus in the storage device in response to a first data transaction from said headend;
dialing into the public switched telephone network in response to a second data transaction from said headend to establish communication with said headend;
transferring said stored channel number to said headend; and
writing a predetermined character to said storage device as an indication that the stored channel number has been transferred.

47. The method according to claim 46 wherein said first data transaction is contained in said television signal.

48. The method according to claim 46 wherein said first data transaction is received over a dedicated data channel.

* * * * *